J] US010051876B2

(12) United States Patent
Witteveen

(10) Patent No.: US 10,051,876 B2
(45) Date of Patent: Aug. 21, 2018

(54) PROCESS AND PRODUCT

(75) Inventor: Frans Witteveen, Leusden (NL)

(73) Assignee: Givaudan S.A., Vernier (CH)

( * ) Notice: Subject to any disclaimer, the term of this patent is extended or adjusted under 35 U.S.C. 154(b) by 883 days.

(21) Appl. No.: 14/131,369

(22) PCT Filed: Jul. 23, 2012

(86) PCT No.: PCT/EP2012/064391
§ 371 (c)(1),
(2), (4) Date: Jan. 24, 2014

(87) PCT Pub. No.: WO2013/011148
PCT Pub. Date: Jan. 24, 2013

(65) Prior Publication Data
US 2014/0147563 A1 May 29, 2014

(30) Foreign Application Priority Data
Jul. 21, 2011 (GB) .................................. 1112488.0

(51) Int. Cl.
*A23F 5/46* (2006.01)
*A23F 5/40* (2006.01)
*A23F 5/44* (2006.01)
(52) U.S. Cl.
CPC .................. *A23F 5/46* (2013.01); *A23F 5/40* (2013.01); *A23F 5/44* (2013.01)
(58) Field of Classification Search
CPC ........................................................ A23F 5/46
USPC ........................................................ 426/302
See application file for complete search history.

(56) References Cited

U.S. PATENT DOCUMENTS

| 5,433,962 | A | * | 7/1995 | Stipp | A23F 5/38 |
| | | | | | 426/385 |
| 5,958,497 | A | | 9/1999 | Grimm et al. | |
| 6,291,006 | B1 | * | 9/2001 | Butterbaugh | A23F 3/32 |
| | | | | | 426/285 |
| 6,746,529 | B1 | | 6/2004 | Witteveen et al. | |
| 2001/0056177 | A1 | * | 12/2001 | Becker | C12N 9/98 |
| | | | | | 530/300 |
| 2002/0037353 | A1 | * | 3/2002 | Villagran | A23L 2/38 |
| | | | | | 426/590 |
| 2004/0037890 | A1 | * | 2/2004 | Burger | A61K 9/1676 |
| | | | | | 424/499 |
| 2010/0009039 | A1 | * | 1/2010 | Robinson | A23C 9/142 |
| | | | | | 426/72 |
| 2011/0135802 | A1 | * | 6/2011 | Robinson | A23C 9/142 |
| | | | | | 426/595 |
| 2011/0135803 | A1 | * | 6/2011 | Robinson | A23C 9/142 |
| | | | | | 426/595 |

FOREIGN PATENT DOCUMENTS

| JP | 59 109 133 A | 6/1984 |
| JP | 2009 219488 A | 10/2009 |
| WO | WO 01/35764 A1 | 5/2001 |

OTHER PUBLICATIONS

Dolf DeRovira "Flvor of Roasted Coffee" published in Tea and coffee—Jul./Aug. 2006, web address www.Flvordynamics.com, 2 pages.*
A.S. Pereyra Gonzaleset al., Maillard reaction kinetics in milk powder: Effect of water activity at mild temperatures; International Dairy Journal 20 (2010) 40-45, journal homepage: www.elsevier.com/locate/idairyj.*
M. A. J. S. van Boekel, Effect of heating on Maillard reactions in milk; Food Chemistry, vol. 62, No. 4, pp. 403-414, 1998 0 1998 Elsevier Science Ltd.*
H.H. Baek and K.R. Cadwallader; Roasted Chicory Aroma Evaluation by Gas Chromatography/Mass Spectrometry/Olfactometry; Journal of Food Science—vol. 63, No. 2, 1998; pp. 234-237.*
International Search Report, Form PCT/ISA/210, dated Oct. 19, 2012, for corresponding PCT International Patent Application No. PCT/EP2012/064391.
Written Opinion of the International Searching Authority, Form PCT/ISA/237, dated Oct. 19, 2012, for corresponding PCT International Patent Application No. PCT/EP2012/064391.
International Preliminary Report on Patentability, Form PCT/IB/373, dated Jan. 21, 2014, for corresponding PCT International Patent Application No. PCT/EP2012/064391.
GB 1112488.0, Great Britain Search Report, dated Nov. 22, 2011.

* cited by examiner

*Primary Examiner* — Jyoti Chawla
(74) *Attorney, Agent, or Firm* — Curatolo Sidoti Co., LPA; Joseph G. Curatolo; Salvatore A. Sidoti

(57) ABSTRACT

A method of making a coffee flavor soluble granule, including the combining of spray-dried coffee flavor with Maillard process flavor and caramel sugar to form a fine powder, suspending this powder in a fluidized bed and spraying it with a aqueous saccharide binder solution. The product provides both the flavor and appearance of coffee, at considerably lower cost, and it can be used in any application in which coffee flavor is desired.

11 Claims, No Drawings

PROCESS AND PRODUCT

CROSS REFERENCE TO RELATED APPLICATIONS

This application is a national stage application of International Application No. PCT/EP2012/064391, filed 23 Jul. 2012, which claims priority from Great Britain Patent Application No. 1112488.0, filed 21 Jul. 2011, from which applications priority is claimed, and which are incorporated herein by reference.

This description relates to the provision of a coffee replacement.

Coffee is one of the world's most popular beverages, and large quantities are consumed daily in all parts of the world. In addition, it is also incorporated into many other comestible products, such as dairy products, confectionery, baked goods, cereals and ice cream. Coffee is sourced from coffee beans, roasted seeds of several species of bushes native to warm and tropical areas of the world. These are also areas where both extremes of weather conditions, exacerbated by climate change, and various conflicts are to be found. This often results in shortages of coffee beans, which is reflected in higher prices, not only for connoisseur coffee but also for the more popular instant coffee. Instant coffee is prepared from coffee beans by roasting, finely grinding, dissolving in water and then freeze-drying or spray-drying. It is not only drunk, but is also used in numerous other comestible products.

It has been proposed to counter the effect of higher prices by providing a replacement for some or even most of the instant coffee powder used to make the drink, while retaining its desirable qualities. It has now been found that this can be achieved by providing a coffee replacement granule, that not only tastes like instant coffee, but also looks like it. There is therefore provided a method of making a coffee flavour soluble granule, comprising the combining of spray-dried coffee flavour with Maillard process flavour and caramel sugar to form a fine powder, suspending this powder in a fluidised bed and spraying it with an aqueous saccharide binder solution.

Other spray-dried flavours may be added in addition to the Maillard flavour. A particular example is the one described in PCT publication WO 01/35764. This comprises a spray-dried composition comprising at least one flavourant encapsulated in a carbohydrate matrix which matrix is characterized by from 40 to 80 wt. % high molecular weight film-forming carbohydrate; from 10 to 30 wt. % mono-, di- and trisaccharides; and from 10 to 30 wt. % maltodextrin, based on the total weight of the carbohydrate matrix. Such flavours may be used up to a maximum extent of 50% by weight of the total granule.

Coffee flavour is widely available both in solution and powder form and is used in comestible products to give a coffee flavour. It may be a NI (nature-identical) coffee, or it may be a blend of coffee plus ingredients that together simulate coffee flavour but containing a reduced proportion of instant coffee. Such products are well known to and widely used by the art, and include, for example, mixtures of several liquid components applied to a carrier such as maltodextrin. The ingredients may include coffee, hazelnut, caramel, vanilla and mixtures thereof.

Maillard process flavours, sometimes referred to as thermal process flavours, are high value building blocks for flavour compositions. They are made by the Maillard reaction of a reducing sugar with a food-grade nitrogen source, typically amino acids, peptides, food proteins, hydrolysed vegetable proteins and yeasts. These flavour compositions are used in culinary and savoury products such as soups, snacks and ready meals where they provide and enhance specific taste donation like roast pork, sautéed chicken or boiled beef. There are many such flavours available. This results in a product that is characteristically dark in appearance.

The binder solution is an aqueous solution of a saccharide that is at least a disaccharide. For example, it may be sucrose or maltodextrin. However, it is particularly a polysaccharide, particularly one of the polysaccharide gums widely used in the food industry. Examples of these include pectin, gum Arabic and xanthan gum.

The concentration of the saccharide should be such that the solution is sprayable (that is, not too viscous), but will agglomerate the mix. A suitable concentration may easily be determined by routine experimentation in every case. However, a rough guide for xanthan is from 0.2-5.0% by weight, particularly from 0.5-1.5%.

In the process, the powdered ingredients (coffee flavour, process flavour and caramel sugar, plus other spray-dried flavours, if desired) are added separately to a fluidised bed and suspended therein, being mixed to give a homogeneous blend. They are then sprayed with the binder solution. This causes agglomeration to form particles. The resulting particles are sieved until a desired particle size is attained (this is usually in the range of 125-4000 micrometers, particularly 125-2000 micrometers.

The spraying of the binder may be carried out using standard equipment in the normal manner known to the art. It is a feature of this process that we are able to produce an agglomerate with the same visual outlook and performance as the 100% instant coffee. The resulting particulate flavours are solid, non-adhesive particles, which can be used in consumable compositions.

The compositions may be used as partial coffee replacements in both beverages and other coffee flavours. For example, it may be used in soluble coffee powders in loose or in sachets (for example, single serve and three-in-one (coffee-sugar-creamer)). In such uses, the compositions can replace instant coffee to the extent of up to 50%, and in some specific uses even 100% by weight without affecting the flavour in any way. This provides a substantial savings. It has been observed that, at replacement levels of the order of 30-40% by weight, consumers are not able to detect any difference between coffee and composition on the one hand, and 100% coffee on the other.

The compositions can also be used in any comestible product requiring coffee flavour, non-limiting examples of which include baked goods such as cakes, biscuits and cereal bars; breakfast cereals; chewing gums; confectionery; ice creams; and dairy products. There is therefore also provided a comestible product, comprising a comestible product base and a coffee flavour as hereinabove described. By "comestible product base" is meant the combination of all ingredients of the comestible product, other than the coffee flavour. These ingredients will naturally change, depending on the nature of the comestible product, but they are completely standard and used in art-recognised proportions, so that the skilled person will have no difficulty formulating with the coffee flavour hereinabove described.

The process is now further described with reference to the following non-limiting example.

EXAMPLE

Experiments as described below were carried out in a fluidised bed utilising the mentioned parameters.

Fluid bed equipment GPCG03 of Glatt AG (Binzen, Germany)

The operating parameters were maintained between the following ranges:

| Temperature Inlet ° C. | Temperature Product ° C. | Air volume M3/h |
|---|---|---|
| 90-95 | 57-60 | 82-87 |

A particulate flavouring composition was prepared from the ingredients shown in the following table:

| Powder Mixture | |
|---|---|
| Caramel sugar | 600 g. |
| Spray dried flavour* | 40 g. |
| Process flavour** | 150 g. |
| MaltoDextrine 10*** | 240 g. |

*Robusta Coffee US151 Flv ex Givaudan
**Grilled type SSF999/K ex Givaudan
***Maltodextrin with a dextrose equivalent of 10

| Binder Solution | |
|---|---|
| Water | 296 g. |
| Xanthane | 4 g. |
| Flavour liquid | 2 g. |
| Bitterness agent | 12 g. |

The resulting composition was a coffee-coloured powder of size 50-500 micron.

The composition was tested in a coffee beverage in the popular three-in-one sachet form (50% sugar, 40% creamer, 10% instant coffee, all by weight). The test samples were as follows:

Sample 1—15% of the coffee flavour was the composition of the example, the rest instant coffee Sample 2—30% was replaced Sample 3—45% was replaced Coffee was made from all four samples and submitted to an expert taste panel, who tested them against a reference composition with 100% instant coffee. The panel's findings were Sample 1—indistinguishable from the reference Sample 2—the experts noticed a difference (but to an extent undetectable by ordinary consumers)

Sample 3—significant difference, certainly detectable by ordinary consumers.

The invention claimed is:

1. A method of making a coffee flavour soluble granule, comprising:
   (a) adding separately to a fluidized bed spray-dried coffee flavour, Maillard process flavour and caramel sugar, and mixing to form a homogeneous blend of fine powder;
   (b) suspending this powder in the fluidized bed; and
   (c) spraying it with an aqueous saccharide binder solution to produce the coffee flavour soluble granule,
   wherein the aqueous saccharide binder comprises one or more polysaccharide gums in an aqueous solution.

2. The method according to claim 1, in which xanthan gum is used as binder, and the solution contains from 0.2-5.0% by weight of xanthan gum.

3. The method according to claim 1, in which there is additionally added a spray-dried composition comprising at least one flavourant encapsulated in a carbohydrate matrix, wherein said matrix comprises from 40 to 80 wt. % high molecular weight film-forming carbohydrate; from 10 to 30 wt. % mono-, di- and trisaccharides; and from 10 to 30 wt. % maltodextrin, based on the total weight of the carbohydrate matrix.

4. The method according to claim 1, in which the saccharide concentration is such that it is sprayable but will agglomerate the mix.

5. The method according to claim 4, in which the spray-dried composition comprises up to 50% by weight of the granule.

6. The method according to claim 1, in which the binder is gum Arabic or xanthan gum.

7. The method according to claim 6, in which xanthan gum is used, and the solution contains from 0.5-1.5% by weight of xanthan gum.

8. A coffee flavour prepared by a method according to claim 1.

9. A soluble single-serve coffee powder comprising instant coffee and up to 50% by weight of a coffee flavour according to claim 8.

10. A three-in-one coffee powder comprising a coffee flavour comprising instant coffee and up to 50% by weight of a coffee flavour according to claim 8.

11. A comestible product comprising a consumable composition base and a coffee flavour according to claim 8.

* * * * *